United States Patent
McLamb

(10) Patent No.: US 8,918,562 B1
(45) Date of Patent: *Dec. 23, 2014

(54) HARDWARE METHOD FOR DETECTING TIMEOUT CONDITIONS IN A LARGE NUMBER OF DATA CONNECTIONS

(71) Applicant: EMC Corporation, Hopkinton, MA (US)

(72) Inventor: Jeffrey T. McLamb, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/907,315

(22) Filed: May 31, 2013

Related U.S. Application Data

(63) Continuation of application No. 13/247,364, filed on Sep. 28, 2011, now Pat. No. 8,495,251.

(51) Int. Cl.
 *G06F 3/00* (2006.01)
 *G06F 5/00* (2006.01)
 *G06F 3/06* (2006.01)

(52) U.S. Cl.
 CPC .................................. *G06F 3/0656* (2013.01)
 USPC .............................................. 710/55; 377/39

(58) Field of Classification Search
 None
 See application file for complete search history.

(56) References Cited

U.S. PATENT DOCUMENTS

| | | | |
|---|---|---|---|
| 5,894,481 A | 4/1999 | Book | |
| 6,002,737 A | 12/1999 | Devanagundy et al. | |
| 6,185,615 B1 * | 2/2001 | Labiaga et al. | 709/224 |
| 8,037,332 B2 * | 10/2011 | Haustein et al. | 713/320 |
| 2001/0019556 A1 * | 9/2001 | Morzano | 370/395 |
| 2004/0193385 A1 | 9/2004 | Yutkowitz | |

* cited by examiner

*Primary Examiner* — Elias Mamo
(74) *Attorney, Agent, or Firm* — Hamilton, Brook, Smith & Reynolds, P.C.

(57) ABSTRACT

Tracking several open data connections is difficult with a large number of connections. Checking for timeouts in software uses valuable processor resources. Employing a coprocessor dedicated to checking timeouts uses valuable logic resources and consumes extra space. In one embodiment, a finite state machine implemented in hardware increases the speed connections can be checked for timeouts. The finite state machine stores a last accessed time stamp for each connection in a memory, and loops through the memory to compare each last accessed time stamp with a current time stamp of the system minus a global timeout value. In this manner, the finite state machine can efficiently find and react to timed out connections.

16 Claims, 7 Drawing Sheets

US 8,918,562 B1

HARDWARE METHOD FOR DETECTING TIMEOUT CONDITIONS IN A LARGE NUMBER OF DATA CONNECTIONS

RELATED APPLICATION

This application is a continuation of U.S. application Ser. No. 13/247,364, filed Sep. 28, 2011. The entire teachings of the above application(s) are incorporated herein by reference.

BACKGROUND

Tracking several open data connections is difficult with a large number of connections. For example, Fibre Channel uses a large number of frame sequences. Tracking these open data connections or frame sequences in the case of Fibre Channel requires monitoring the status of the data connections. For example, a data connection is disrupted when a frame is lost or dropped because of a data error, or when a remote link partner is disconnected due to an error. Checking a connection for a "timeout" indicates such a connection disruption. A "timeout" is indicated by a connection not transmitting or receiving any packets in an excessive period of time.

For example, consider a connection with a timeout value of 2 seconds that receives a packet at time t=0 s, and then sends a reply at t=1 s. The connection "times out" if it does not receive or transmit another packet before t=3 s.

Some implementations of timeout monitoring use a microprocessor and software to check each of the several connections for a timeout. In this implementation, software instructs the processor to loop through the connections and access each open connection's data structure to check for a timeout. The processor loops through the connections indefinitely because a connection can timeout at any time. In this implementation, the processor is either embedded in the connection tracking hardware, or an external processor is available to indefinitely check for timeouts. Connecting an additional processor just for timeout monitoring is undesirable in some systems, like a high-throughput streaming system, because large logic electronics used to connect the additional processor generally run slower than the connection data rate. Such an implementation is unnecessarily complex and costly.

BRIEF DESCRIPTION

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
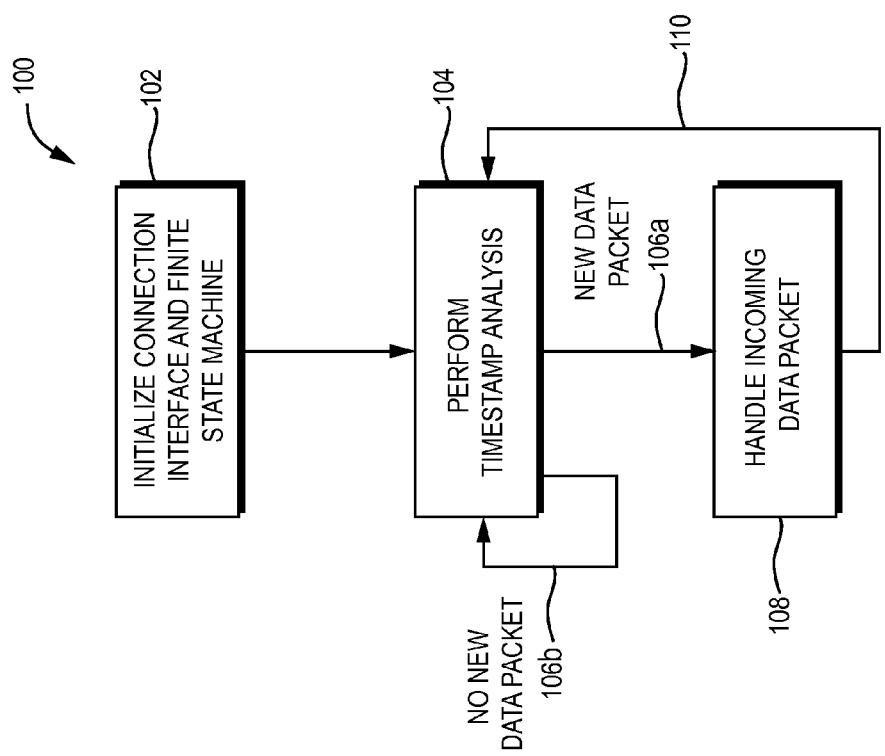
FIG. 1 is a diagram illustrating the steps of a finite state machine process for checking timeouts on a plurality of connections.

A description of example embodiments follows.

In one embodiment, a method includes first initializing a finite state machine that includes an interface with multiple connections, a memory buffer for storing a last accessed timestamp, and a memory pointer. Locations in the memory buffer are initialized by setting a status property of the locations to inactive. The memory pointer is initialized by setting it to point to one of the locations in the memory buffer. The method then performs a timestamp analysis. First, the timestamp analysis reads a last accessed timestamp corresponding to the location of the memory pointer when the status property of the location of the memory pointer is active. Second, the timestamp analysis determines whether a timeout has occurred based on the last accessed timestamp, a current timestamp and a stored time out value. If a timeout has not occurred or the location of the memory pointer is inactive, the method increments the memory pointer. If a timeout has occurred and the location of the memory pointer is active, the method notifies a higher communication layer, updates the status property of the location of the memory pointer to inactive. The method then increments the memory pointer.

The method includes, if an incoming data packet is received, handling the packet by processing the incoming data packet with an incoming data handler configured to process the incoming data packet in the higher communication layer. If the incoming data packet is part of a new connection, the new connection status of the incoming data packet is indicated by a lack of an entry corresponding to the connection of the incoming data packet in the plurality of memory locations. The method stores the data packet's connection information in a location in the memory buffer. Last, the method updates the status property of the location to active and sets the last accessed timestamp in one of the plurality of locations in the memory buffer before repeating the timestamp analysis.

In one embodiment, a system includes a finite state machine configured to initialize an interface with multiple connections, initialize a memory buffer for storing a last accessed timestamp, and initialize a memory pointer by setting it to point to one of the locations. Locations in the memory buffer are initialized by setting a status property of the locations to inactive.

The finite state machine performs a timestamp analysis. When the status property of the location of the memory pointer is active, the finite state machine reads a last accessed timestamp corresponding to the location of the memory pointer, and determines whether a timeout has occurred based on the last accessed timestamp, a current timestamp and a stored time out value. If a time out has not occurred or the location of the memory pointer is inactive, the finite state machine increments the memory pointer. If a timeout has occurred and the location of the memory pointer is active, the finite state machine notifies a higher communication layer and updates the status property of the location of the memory pointer to inactive. The finite state machine then increments the memory pointer.

In one embodiment, if an incoming data packet is received, the finite state machine handles the packet by processing the incoming data packet with an incoming data handler configured to process the incoming data packet in the higher communication layer. If the incoming data packet is part of a new connection, the new connection status of the incoming data packet is indicated by a lack of an entry corresponding to the connection of the incoming data packet in the memory locations, and the finite state machine stores the data packet in a location in the memory buffer. The finite state machine then updates the status property of the location to active and sets the last accessed timestamp in the location in the memory buffer. The finite state machine then repeats the timestamp analysis step.

In one embodiment, the finite state machine determines whether a timeout has occurred by calculating an expiration timestamp based on the difference of the current timestamp and the stored time out value and triggers a timeout if the expiration timestamp is greater than the last accessed timestamp.

In some embodiments, the finite state machine includes a clock cycle, and increments the current timestamp on each clock cycle.

In some embodiments, the memory buffer includes a connection tracking memory buffer.

The incoming data handler processes data by detecting a new frame on a receive buffer, reading the header of the new frame to update or create timestamp data in a location in the connection tracking memory buffer, and storing the new frame in one of a plurality of data storing memory locations. In some embodiments, the incoming data handler is Fibre Channel. The stored timeout value is at least one of a global timeout value based on a connection protocol and a local timeout value based on an individual connection.

In one embodiment, a finite state machine, as a portion of a larger finite state machine, and a timestamp comparison logic continually search through a memory containing information about when each of the open connections tracked in the memory were last accessed. The finite state machine and timestamp logic employ a comparator to compare the timestamp of each entry in the memory against a continually-updating timeout value. The timeout value is defined as the current time base of the system minus the configured timeout value. If an active connection entry in the table has a "last accessed timestamp" less than the timeout value, a timeout condition is recognized, the finite state machine removes the connection and alerts higher-level software of the timeout. The finite state machine and timestamp comparison logic continuously increment a memory pointer to check each address in the connection tracking memory in sequence. Upon reaching the end of the memory address range, the memory pointer points to the initial address in the memory and repeats scanning from the beginning The finite state machine is incorporated as a part of a larger system which also handles incoming data, so the memory pointer is maintained in a register while incoming data is serviced. When incoming data is serviced, the memory is updated with new data and updated timestamps for connections accessed in arbitrary memory locations. The finite state machine is also guaranteed to check at least one of the next addresses in the memory for timeout, even in high-load conditions where incoming data arrives continuously and the memory is busy handling data connections most of the time.

Implementing a timeout detector a finite state machine in hardware efficiently uses resources and guarantees timeout conditions are quickly recognized because even for a large number of open connections, the entire memory can be checked on an idle link in 2*n clock cycles, where n is the number of entries in the connection tracking memory. For example, in a system with an idle link with 2K memory entries and a 100 MHz clock, the memory entries can be checked for timeouts in approximately 40 microseconds. In a system with a busy link, when large data frames are received continuously, the entire memory can be checked in 271*n clock cycles. In the example above with 2K memory entries with a 100 Mhz clock, the entire memory can be checked in 5-6 milliseconds, or 5K-6K microseconds. This maximum delay is negligible because timeout values for connections in most protocols are 2 seconds or greater. The finite state machine outperforms the latency imposed by a processor and software searching for timeouts under similar load conditions.

FIG. 1 is a diagram illustrating the steps of a finite state machine process 100 for checking timeouts on a plurality of connections. The finite state machine process 100 begins with an initialization step 102. The initialization step 102 initializes the connection interface and the finite state machine. After the initialization step 102 has completed, the finite state machine process 100 advances to the time stamp analysis step 104. The time stamp analysis step 104 determines whether a connection has timed out. When no new data packet 106B requires processing, the finite state machine process 100 remains in the perform time stamp analysis state and continues checking successive time stamps in a memory buffer. When a new data packet 106A requires processing, the finite state machine process 100 processes the incoming data packet in a handle incoming data step 108 and then returns to the time stamp analysis step 104.

Figure 2:
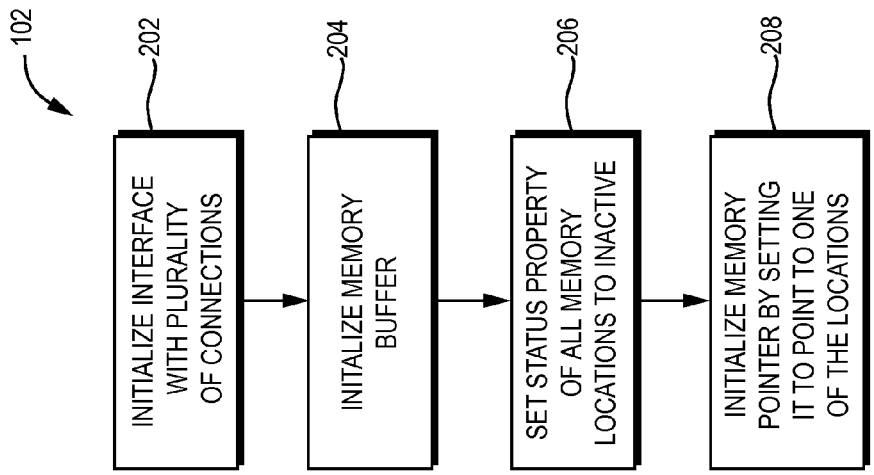
FIG. 2 is a diagram illustrating the initialization step of the finite state machine.

FIG. 2 is a diagram illustrating the initialization step 102 of the finite state machine 100. The initialization step 102 first initializes an interface with a plurality of connections 202. The initialization step 102 then initializes a memory buffer 204 with memory locations. Next, the initialization step 102 sets the state property of all memory locations to inactive 206. Finally, the initialization step 102 initializes a memory pointer by setting the memory pointer 208 to point to one of the memory locations in the memory buffer. After step 208, the finite state machine advances to the time stamp analysis step 104.

Figure 3:
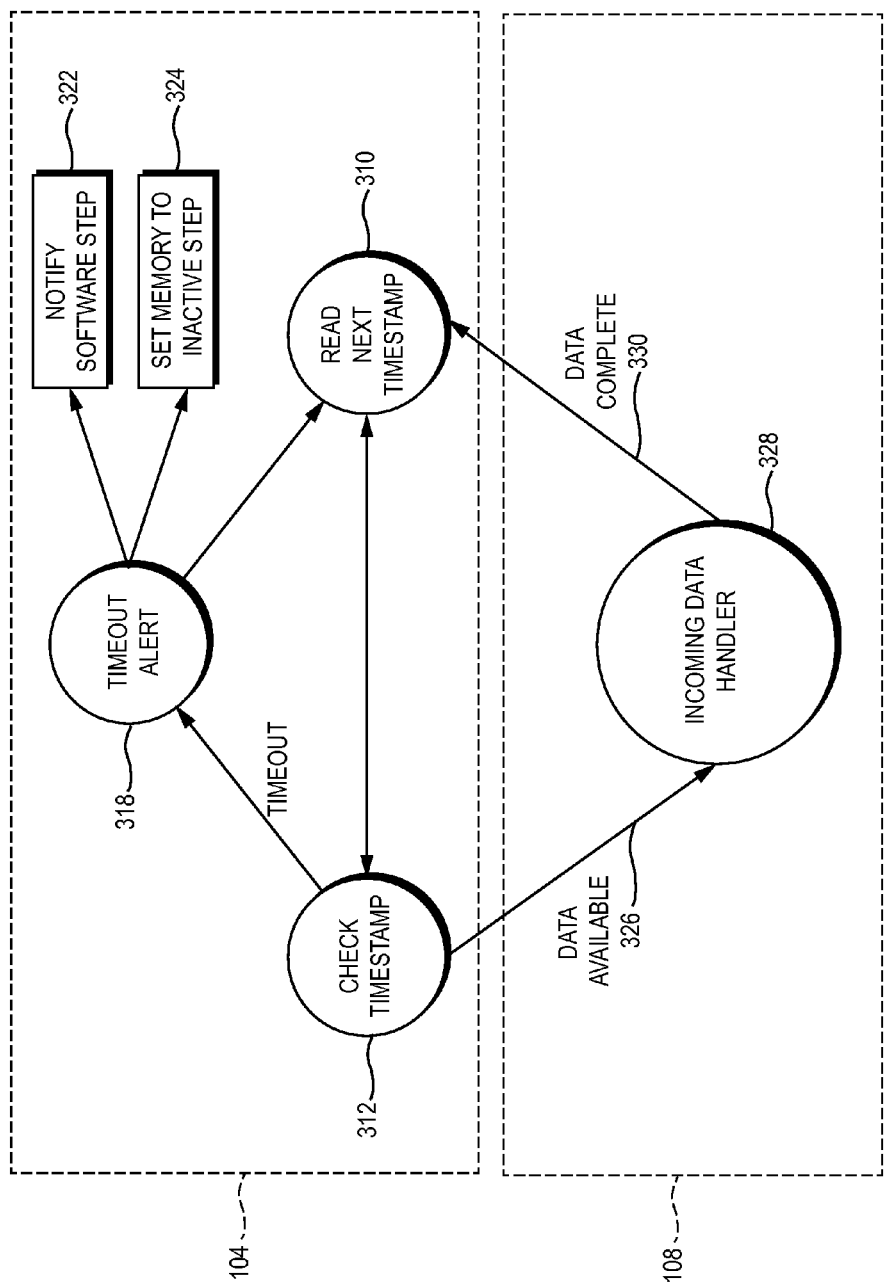
FIG. 3 is a diagram illustrating the time stamp analysis step and handle incoming data step of the finite state machine.

FIG. 3 is a diagram illustrating the time stamp analysis step 104 and handle incoming data step 108 of the finite state machine 100. First, the finite state machine enters a read next time stamp state 310. The finite state machine then enters a check time stamp state 312. The check time stamp state 312 checks the current time, the last accessed time of a connection and a global time out value to determine whether the connection has timed out. If the connection has not timed out, the check time stamp state returns to the read next time stamp state 310. If the connection has timed out, the finite state machine advances to a time out alert state 318.

The time out alert state 318 performs two steps. First, it notifies software 322 that the connection timed out. Second, it sets the memory to inactive 324 in the memory buffer. The finite state machine then enters the reads next time stamp state 310.

The check time stamp state advances to the incoming data handler state machine when data is available from an outside connection. The incoming data handler finite state machine 328, in some embodiments, sends the data to a higher network layer. When the incoming data handler finite state machine 328 completes processing the data from the connection, the finite state machine returns to the read next time stamp state 310.

Figure 4:
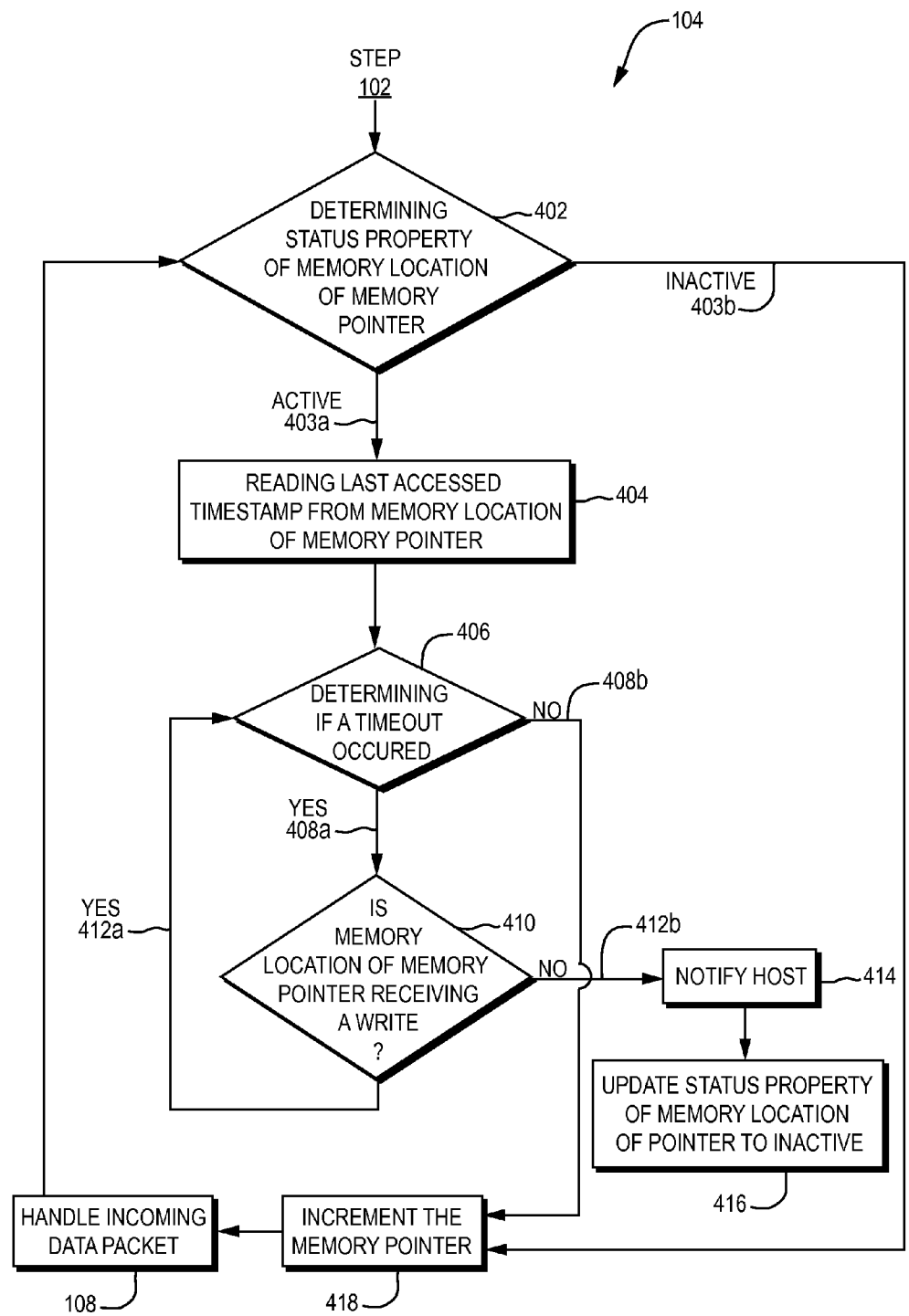
FIG. 4 is a diagram illustrating a time stamp analysis step in a finite state machine process.

FIG. 4 is a diagram illustrating the time stamp analysis step 104 in the finite state machine process 100. The time stamp analysis step 104 is entered after the completion of the initialization step 102. The time stamp analysis step 104 begins by reading the connection status 402. Reading the connection status 402 includes determining the status property of the memory location in the buffer where the memory pointer is pointing. If the memory location is active 403A, the time stamp analysis step 104 advances to reading the last accessed time stamp 404. The last accessed time stamp is read from the memory location where the memory pointer is pointing. Next, the time stamp analysis step 104 determines time out status 406 by determining whether the connection has timed out. The steps to determine whether a connection has timed out are shown in more detail in FIG. 6 below.

When a connection has timed out, the time stamp analysis step 104 advances along path 408A to the memory activity step 410. The memory activity step 410 determines whether the memory location where the memory pointer is pointing is currently receiving a write. If the memory location is receiving a write, then the time stamp analysis step 104 returns to the determining time out status step 406. When the memory location is not receiving a write 412B, the time stamp analysis step 104 notifies a host or software in step 414 and then sets the status property of the connection to inactive in step 416. The connection is set to inactive by updating the status property of the memory location of the pointer to inactive. The time stamp analysis step 104 increments the memory pointer 418 before handling any incoming data packets 108.

Returning to the determining time out status step 406, when a connection has not timed out 408B, the time stamp analysis step 104 advances to the incrementing the memory pointer step 418. Similarly, when the reading connection status step 402 determines that the status property of the memory location of the memory pointer is inactive, the time stamp analysis step 104 advances to the increment of memory pointer step 418.

Figure 5:
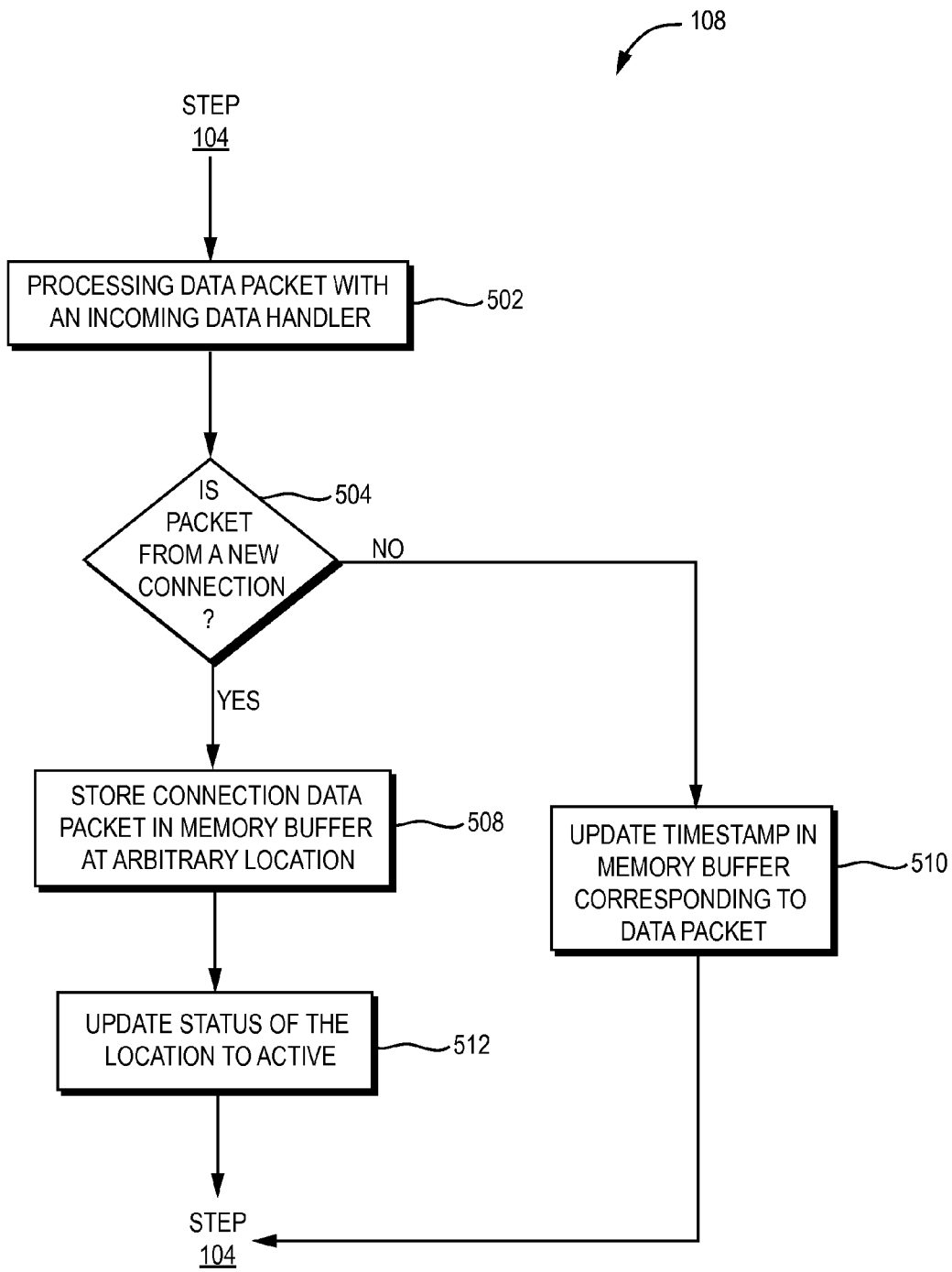
FIG. 5 is a diagram illustrating a handle incoming data step.

FIG. 5 is a diagram illustrating the handle incoming data step 108. The handle incoming data step 108 is entered from the time stamp analysis step 104. The handle incoming data step 108 then enters the process incoming data packet step 502, which processes incoming data packets from a new or existing connection. The new connection check step 504 determines whether the data packets are from a new or existing connection. If the data packets are from a new connection, the handle incoming data step 108 enters the store connection step 508. The store connection step 508 stores the connection data packet in the memory buffer at an arbitrary location and enters the update connection status step 512. The update connection status step 512 sets the connection status to active by updating the status property of the location in memory to active. When the data packet is not from a new connection, and is therefore from an existing connection, the handle incoming data step 108 enters into the update connection information step 510. The updated connection information step 510 updates the time stamp in the memory buffer corresponding to the data packet. The time stamp is updated 512 with the current time stamp of the system. Last, the handle incoming data step 108 returns to the time stamp analysis step 104.

Figure 6:
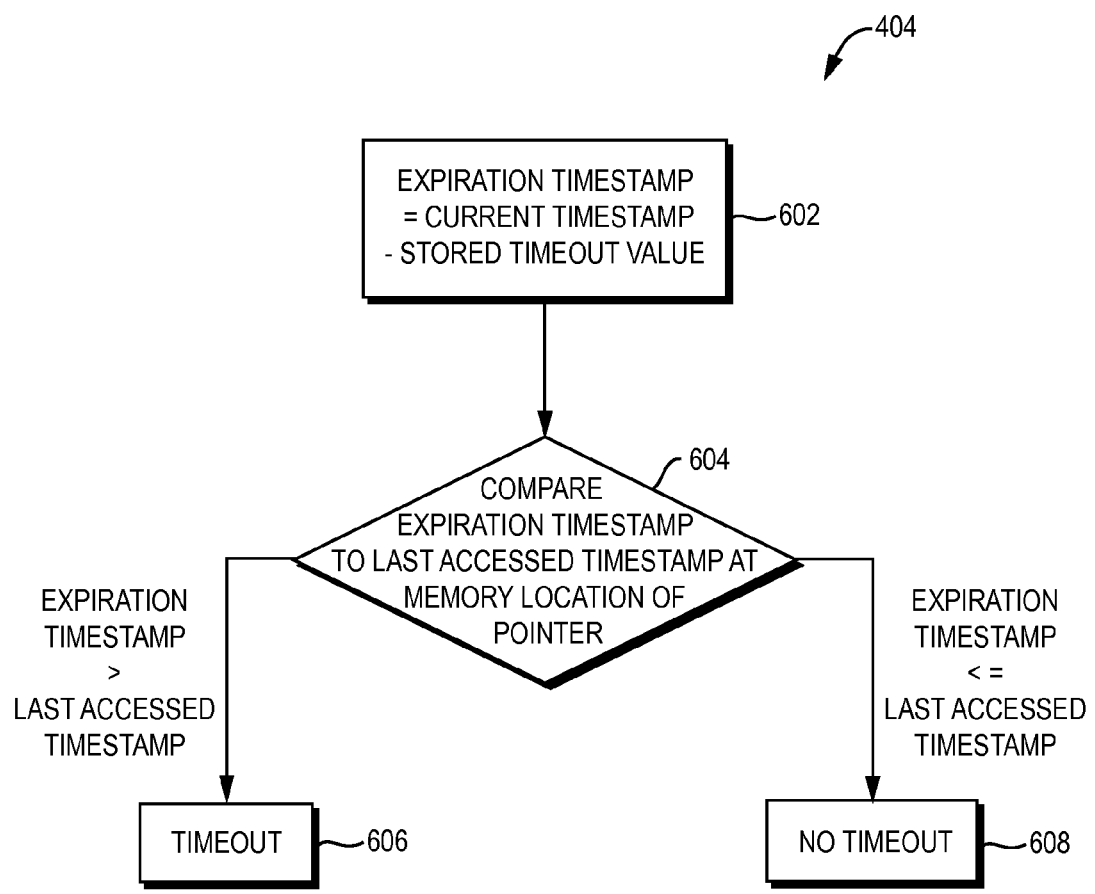
FIG. 6 is a diagram illustrating a time stamp comparison process.

FIG. 6 is a diagram illustrating the time stamp comparison process 404. The time stamp comparison process compares a time stamp of a connection to the current time of the system and a predetermined time out value. First, the time stamp comparison process calculates an expiration time stamp 602. The expiration time stamp is equal to the current time stamp minus the stored time out value. Once the expiration timestamp is calculated the time stamp comparison process 404 advances to the determine time out step 604. The determine time out step 604 compares the expiration time stamp to a last access time stamp stored in the memory location where the memory pointer is pointing. When the expiration time stamp is greater than the last access time stamp of the memory pointer, the time stamp comparison process 404 returns that there is a time out 606. When the expiration time stamp is less than or equal to the last access time stamp of the memory pointer, the time stamp comparison process 404 returns that there is not a timeout 608.

Figure 7:
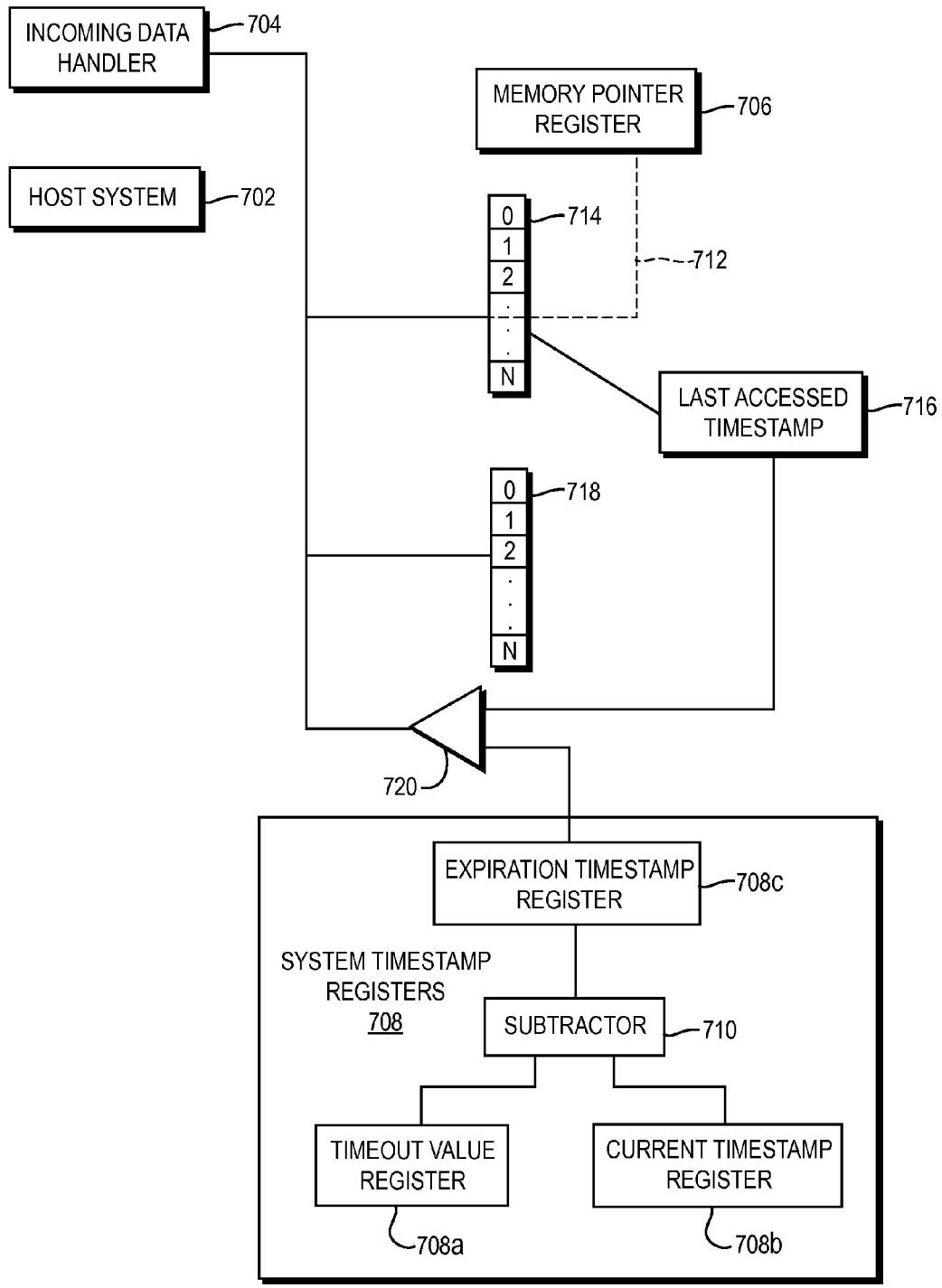
FIG. 7 is a diagram illustrating an implementation of a finite state machine in hardware.

FIG. 7 is a diagram illustrating an embodiment of a hardware implementation of the finite state machine 700. The hardware implementation of the finite state machine 700 includes a host system 702 operatively coupled with a system bus 722. The system bus 722 is also operatively coupled with a incoming data handler 704, a memory pointer register 706, a status memory buffer 714, a data memory buffer 718 and a comparator 720. The incoming data handler 704 handles incoming data packets as they arrive at the system. When the incoming data handler 704 receives a data packet from a connection, the status memory buffer 714 is updated. If the data packet is from an existing connection, the memory entry in the status memory buffer 714 is updated with the system's current time stamp. If the data packet is from a new connection, the new connection information is stored the status memory buffer and the status property is updated to active. In addition, the data packet from the incoming data handler 704 is stored in a corresponding location in data memory buffer 718, in some embodiments.

The memory pointer register 706 stores a memory pointer 712, which points to a memory location in the status memory buffer 714. As the finite state machine process 100 checks time stamps in the status memory buffer 714, the memory pointer 712 is incremented until it reaches the end of status memory buffer 714. When the memory pointer 712 reaches the end of status memory buffer 714, the memory pointer is reset to the beginning of the status memory buffer 714 and the finite state machine process continues to increment the memory pointer 712. In this manner, the entire status memory buffer 714 is continually checked for the values of the last accessed time stamp 716.

The comparator 720 compares the last accessed time stamp 716 to the system time stamp registers 708. The system time stamp registers 708 include timeout value register 708A, current timestamp register 708B and expiration time stamp register 708C. The timeout value register 708A and current timestamp register 708B are coupled with a subtractor 710. The subtractor 710 subtracts the timeout value register 708A from the current timestamp register 708B and outputs the result to the expiration time stamp register 708C. The expiration time stamp register 708C is coupled with the comparator 720. The last access time stamp 716 is also coupled with the comparator 720. The comparator does not signal a timeout when it determines that the expiration time stamp is less than or equal to the last accessed time stamp. The comparator does signal a timeout when it determines the expiration time stamp is greater than the last accessed time stamp. When the comparator 720 signals a timeout, the host system notifies software and the status memory buffer 714 sets the memory location where the memory pointer 712 is pointing to inactive.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   a) initializing a plurality of registers including
      (i) an interface with a plurality of connections, (ii) a memory buffer including a plurality of locations for storing a last accessed timestamp by setting a status property of the locations to inactive, and (iii) a memory pointer, the memory pointer initialized by setting it to point to one of the plurality of locations;

b) performing a timestamp analysis by:
  i) when the status property of the location of the memory pointer is active
    A) reading a last accessed timestamp corresponding to the location of the memory pointer;
    B) determining whether a timeout has occurred based on the last accessed timestamp, a current timestamp and a stored time out value; and
    C) if a timeout has occurred and the location of the memory pointer is active, notifying a higher communication layer and updating the status property of the location of the memory pointer to inactive; and
  ii) incrementing the memory pointer; and
c) if an incoming data packet is received, handling the packet by:
  i) processing the incoming data packet with an incoming data handler configured to process the incoming data packet in the higher communication layer;
  ii) updating the status property of the location to active and setting the last accessed timestamp in one of the plurality of locations in the memory buffer.

2. The method of claim 1 further comprising determining whether a timeout has occurred by calculating an expiration timestamp based on the difference of the current timestamp and the stored time out value and triggering a timeout if the expiration timestamp is greater than the last accessed timestamp.

3. The method of claim 1 further comprising incrementing the current timestamp on a clock cycle.

4. The method of claim 1 wherein the incoming data handler is Fibre Channel.

5. The method of claim 1 wherein the memory buffer includes a connection tracking memory buffer.

6. The method of claim 5 wherein the incoming data handler processes data by detecting a new frame on a receive buffer, reading the header of the new frame to update or create timestamp data in a location in the connection tracking memory buffer, and storing the new frame in one of a plurality of data storing memory locations.

7. The method of claim 1 wherein the stored timeout value is at least one of a global timeout value based on a connection protocol and a local timeout value based on an individual connection.

8. The method of claim 1, wherein handling the packet further includes:
  if the incoming data packet is part of a new connection, a new connection status of the incoming data packet indicated by a lack of an entry corresponding to a connection of the incoming data packet in the plurality of memory locations, storing the data packet in one of the locations in the memory buffer.

9. A system comprising:
a plurality of registers, wherein the system is configured to:
  a) initialize the plurality of registers by initializing:
    (i) an interface with a plurality of connections,
    (ii) a memory buffer including a plurality of locations for storing a last accessed timestamp by setting a status property of the locations to inactive, and
    (iii) a memory pointer by setting it to point to one of the locations;
  b) perform a timestamp analysis by:
    i) when the status property of the location of the memory pointer is active;
      A) reading a last accessed timestamp corresponding to the location of the memory pointer;
      B) determining whether a timeout has occurred based on the last accessed timestamp, a current timestamp and a stored time out value; and
      C) if a timeout has occurred and the location of the memory pointer is active, notifying a higher communication layer and updating the status property of the location of the memory pointer to inactive; and
    ii) incrementing the memory pointer; and
  c) if an incoming data packet is received, handle the packet by:
    i) processing the incoming data packet with an incoming data handler configured to process the incoming data packet in the higher communication layer; and
    iii) updating the status property of the location to active and setting the last accessed timestamp in one of the plurality of locations in the memory buffer.

10. The system of claim 9, further comprising determining whether a timeout has occurred by calculating an expiration timestamp based on the difference of the current timestamp and the stored timeout value and triggering a timeout if the expiration timestamp is greater than the last accessed timestamp.

11. The system of claim 9 further comprising a clock cycle, wherein the state machine is further configured to increment the current timestamp on each clock cycle.

12. The system of claim 9 wherein the incoming data handler is Fibre Channel.

13. The system of claim 9 wherein the memory buffer includes a connection tracking memory buffer.

14. The system of claim 9 wherein the incoming data handler processes data by detecting a new frame on a receive buffer, reading the header of the new frame to update or create timestamp data in a location in the connection tracking memory buffer, and storing the new frame in one of a plurality of data storing memory locations.

15. The system of claim 9 wherein the stored timeout value is at least one of a global timeout value based on a connection protocol and a local timeout value based on an individual connection.

16. The system of claim 9, wherein handling the packet further includes:
  if the incoming data packet is part of a new connection, a new connection status of the incoming data packet indicated by a lack of an entry corresponding to a connection of the incoming data packet in the plurality of memory locations, storing the data packet in one of the locations in the memory buffer.

* * * * *